United States Patent

Mason et al.

(10) Patent No.: US 7,512,748 B1
(45) Date of Patent: Mar. 31, 2009

(54) MANAGING LOCK RANKINGS

(75) Inventors: W. Anthony Mason, Milford, NH (US); Peter G. Viscarola, Mont Vernon, NH (US); Mark J. Cariddi, Merrimack, NH (US); Scott J. Noone, Nashua, NH (US)

(73) Assignee: OSR Open Systems Resources, Inc., Amherst, NH (US)

( * ) Notice: Subject to any disclaimer, the term of this patent is extended or adjusted under 35 U.S.C. 154(b) by 286 days.

(21) Appl. No.: 11/505,582

(22) Filed: Aug. 17, 2006

(51) Int. Cl.
*G06F 12/00* (2006.01)

(52) U.S. Cl. ...................................... 711/151; 711/163

(58) Field of Classification Search ........................ None
See application file for complete search history.

(56) References Cited

U.S. PATENT DOCUMENTS

| | | | |
|---|---|---|---|
| 4,135,240 A | 1/1979 | Ritchie | |
| 4,959,811 A | 9/1990 | Szczepanek | |
| 4,984,153 A * | 1/1991 | Kregness et al. | 711/152 |
| 5,027,395 A * | 6/1991 | Anderson et al. | 713/176 |
| 5,488,701 A | 1/1996 | Brady et al. | |
| 5,506,983 A | 4/1996 | Atkinson et al. | |
| 5,530,850 A | 6/1996 | Ford et al. | |
| 5,537,588 A | 7/1996 | Engelmann et al. | |
| 5,551,003 A | 8/1996 | Mattson et al. | |
| 5,606,983 A | 3/1997 | Monty et al. | |
| 5,652,879 A | 7/1997 | Harris et al. | |
| 5,664,178 A | 9/1997 | Sinofsky | |
| 5,706,504 A | 1/1998 | Atkinson et al. | |
| 5,715,441 A | 2/1998 | Atkinson et al. | |
| 5,734,861 A | 3/1998 | Cohn et al. | |
| 5,764,880 A | 6/1998 | Gerdt et al. | |
| 5,799,324 A | 8/1998 | McNutt et al. | |
| 5,802,344 A | 9/1998 | Menon et al. | |
| 5,832,515 A | 11/1998 | Ledain et al. | |
| 5,857,207 A | 1/1999 | Lo et al. | |
| 5,873,097 A | 2/1999 | Harris et al. | |
| 5,991,893 A * | 11/1999 | Snider | 714/4 |
| 5,996,054 A | 11/1999 | Ledain et al. | |
| 6,006,227 A | 12/1999 | Freeman et al. | |
| 6,021,408 A | 2/2000 | Ledain et al. | |
| 6,021,509 A | 2/2000 | Gerdt et al. | |
| 6,038,668 A | 3/2000 | Chipman et al. | |
| 6,065,100 A | 5/2000 | Schafer et al. | |

(Continued)

OTHER PUBLICATIONS

U.S. Appl. No. 11/509,391, filed Aug. 24, 2006.

(Continued)

*Primary Examiner*—Kevin Verbrugge
(74) *Attorney, Agent, or Firm*—K&L Gates LLP

(57) ABSTRACT

Methods of monitoring a computer system. The methods may comprise the steps of calculating a first checksum of a data location and receiving a request from an operation running on the computer system for a lock corresponding to the data location. The methods may also comprise the steps of calculating a second checksum of the data location, and generating an indication if the first checksum and the second checksum are not equivalent. Also, methods of detecting a lock ranking violation in a computer system. The methods may comprise the steps of receiving a request from an operation for a first lock associated with a first data storage location and reviewing a list of locks issued to the operation. The methods may also comprise the step of determining whether the operation possesses a lock ranked higher than the first lock.

16 Claims, 6 Drawing Sheets

U.S. PATENT DOCUMENTS

| | | | |
|---|---|---|---|
| 6,101,186 A | 8/2000 | Craig | |
| 6,128,630 A | 10/2000 | Shackelford | |
| 6,148,368 A | 11/2000 | DeKoning | |
| 6,240,527 B1 | 5/2001 | Schneider | |
| 6,260,036 B1 | 7/2001 | Almasi et al. | |
| 6,321,239 B1 | 11/2001 | Shackelford | |
| 6,336,164 B1 | 1/2002 | Gerdt et al. | |
| 6,366,987 B1 | 4/2002 | Tzelnic et al. | |
| 6,377,958 B1 | 4/2002 | Orcutt | |
| 6,381,682 B2 * | 4/2002 | Noel et al. | 711/153 |
| 6,418,509 B1 | 7/2002 | Yanai et al. | |
| 6,430,548 B1 | 8/2002 | Deis et al. | |
| 6,449,688 B1 | 9/2002 | Peters et al. | |
| 6,490,664 B1 | 12/2002 | Jones et al. | |
| 6,529,909 B1 | 3/2003 | Bowman-Amuah | |
| 6,535,949 B1 | 3/2003 | Parker | |
| 6,577,254 B2 | 6/2003 | Rasmussen | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,625,671 B1 | 9/2003 | Collette et al. | |
| 6,628,411 B2 | 9/2003 | Miller et al. | |
| 6,633,244 B2 | 10/2003 | Avery et al. | |
| 6,633,883 B2 | 10/2003 | Koskas | |
| 6,643,405 B1 | 11/2003 | Sako | |
| 6,643,652 B2 | 11/2003 | Helgeson et al. | |
| 6,654,851 B1 | 11/2003 | McKean | |
| 6,657,565 B2 | 12/2003 | Kampf | |
| 6,664,903 B2 | 12/2003 | Kugai | |
| 6,704,839 B2 | 3/2004 | Butterworth et al. | |
| 6,711,709 B1 | 3/2004 | York | |
| 6,732,125 B1 | 5/2004 | Autrey et al. | |
| 6,738,863 B2 | 5/2004 | Butterworth et al. | |
| 6,741,747 B1 | 5/2004 | Burns et al. | |
| 6,775,781 B1 | 8/2004 | Phillips et al. | |
| 6,782,319 B1 | 8/2004 | McDonough | |
| 6,785,768 B2 | 8/2004 | Peters et al. | |
| 6,795,640 B1 | 9/2004 | Honda | |
| 6,795,897 B2 | 9/2004 | Benveniste et al. | |
| 6,847,681 B2 | 1/2005 | Saunders et al. | |
| 6,856,993 B1 | 2/2005 | Verma et al. | |
| 6,901,403 B1 | 5/2005 | Bata et al. | |
| 6,944,619 B2 | 9/2005 | Gruenwald | |
| 7,051,031 B2 * | 5/2006 | Schein | 707/10 |
| 7,085,766 B2 | 8/2006 | Keith, Jr. | |
| 7,107,267 B2 * | 9/2006 | Taylor | 707/8 |
| 7,191,189 B2 | 3/2007 | Bhatti | |
| 7,340,581 B2 | 3/2008 | Gorobets et al. | |
| 2002/0010844 A1 * | 1/2002 | Noel et al. | 711/153 |
| 2002/0052868 A1 | 5/2002 | Mohindra et al. | |
| 2002/0073066 A1 | 6/2002 | Coutts et al. | |
| 2002/0143735 A1 | 10/2002 | Ayi et al. | |
| 2003/0123446 A1 | 7/2003 | Muirhead et al. | |
| 2004/0167916 A1 | 8/2004 | Basso et al. | |
| 2004/0186920 A1 | 9/2004 | Birdwell et al. | |
| 2005/0144189 A1 | 6/2005 | Edwards et al. | |
| 2005/0240966 A1 | 10/2005 | Hindle et al. | |
| 2006/0031246 A1 | 2/2006 | Grayson | |
| 2006/0070076 A1 | 3/2006 | Ma | |
| 2006/0101025 A1 | 5/2006 | Tichy et al. | |
| 2006/0123250 A1 | 6/2006 | Maheshwari et al. | |
| 2006/0277153 A1 | 12/2006 | Mason et al. | |

OTHER PUBLICATIONS

U.S. Appl. No. 11/789,147, filed Apr. 24, 2007.
U.S. Appl. No. 11/844,102, filed Aug. 23, 2007.
Office Action issued on Jul. 20, 2007 in U.S. Appl. No. 11/145,433.
Office Action (Interview Summary) issued on Nov. 14, 2007 in U.S. Appl. No. 11/145,433.
Response to Nov. 14, 2007 Office Action (Interview Summary) filed Dec. 4, 2007 in U.S. Appl. No. 11/145,433.
Burrows et al., "On-line Data Compression in a Log-structured File System," proceedings of the Fifth International Conference on Architectural Support for Programming Languages and Operating Systems, Oct. 12-15, 1992, ACM Press, pp. 1-21.
Rosenblum, Mendel and John K. Ousterhout, "The Design and Implementation of a Log-Structured File System," ACM Transactions on Computer Systems, vol. 10, No. 1, Feb. 1992; pp. 26-52.
"Windows Streams—An Introduction to File System Streams," printed from http://www.osronline.com, The NT Insider, vol. 13, Issue 2, Mar.-Apr. 2006, Apr. 17, 2006, 6 pages.
"Sponsor Sessions," printed from http://microsoft.com/whdc/driverdevcon/ddctracks2005_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Office Action issued on Mar. 19, 2008 in U.S. Appl. No. 11/145,433.
Office Action (Interview Summary) issued on May 23, 2008 in U.S. Appl. No. 11/145,433.
Office Action issued on Sep. 16, 2008 in U.S. Appl. No. 11/145,433.

* cited by examiner ns software applications have included multiple discrete operations that are executed at the same time. Often these operations need to access and manipulate common data at a single memory and/or disk location. If software is not carefully designed, then multiple operations may try to write to a single data location at the same time. This may be referred to as a race condition. Race conditions often result in corrupt data and can cause software applications to generate incorrect results.

Mechanisms called locks have been implemented to prevent race conditions. According to common locking schemes, operations request a "lock" before accessing a data location. If the data location is available, then the lock is granted and the operation is cleared to access the data location. If another operation is accessing the data location, (e.g., another operation has the lock) then the lock request may be denied. The requesting operation may then either terminate, or wait until the lock becomes available.

Although properly implemented locking schemes may prevent many race conditions, they have the capability to create their own problems. For example, an operation A and an operation B may both need to perform tasks that require access to two data locations, X and Y, at the same time. If A holds the lock for X and B holds the lock for Y, then neither application may be able to perform its task. In that case, A and B may each wait indefinitely for both locks to become available, causing the software application to stop or hang-up. This problem, called deadlock, is commonly avoided by using a lock ranking or lock hierarchy. According to a lock ranking, each concurrently executed operation is required to request locks in a particular order. For example, both A and B could be required to request the lock for X before requesting the lock for Y. Accordingly, the situation where both applications hold one, but not both, of the locks can be avoided.

As with all programming methods, specific implementations of locks and lock ranking systems often include bugs. These bugs can be particularly difficult to debug because their symptoms, race and deadlock conditions, are not deterministic and cannot be easily reproduced. For example, a program having a race or deadlock related defect may run flawlessly four times in a row, and then crash on the fifth execution. Adding to the difficulty of finding and correcting for race and deadlock problems is the fact that they are highly dependent on execution timing. For example, latent race or deadlock related problems in an application developed and tested on a first system type may not manifest themselves until the application is run on a faster system.

SUMMARY

In one general aspect, embodiments of the invention are directed to methods of monitoring a computer system. The methods may comprise the steps of calculating a first checksum of a data location and receiving a request from an operation running on the computer system for a lock corresponding to the data location. The methods may also comprise the steps of calculating a second checksum of the data location, and generating an indication if the first checksum and the second checksum are not equivalent.

In another general aspect, embodiments of the invention are directed to methods of detecting a lock ranking violation in a computer system. The methods may comprise the steps of receiving a request from an operation for a first lock associated with a first data storage location and reviewing a list of locks issued to the operation. The methods may also comprise the step of determining whether the operation possesses a lock ranked higher than the first lock.

BRIEF DESCRIPTION OF THE FIGURES

Embodiments of the present invention are described herein, by way of example, in conjunction with the following figures, wherein.

DETAILED DESCRIPTION OF THE INVENTION

As used herein, the term "operation" refers to a series of instructions that may be executed by a processor or processors to carry out a specific purpose or purposes (e.g., a thread, a process, a fiber, a task, a job, a transaction, etc.). Also, as used herein, the term "application" may refer to a piece of software that may include one or more operations. For example, an application may be a user application, an operating system component or service, etc.

Various embodiments of the present invention are directed to lock utility functionality that may be used to detect lock-related defects in software applications. After lock-related defects are detected, they may be documented for debug purposes. In various embodiments, detected defects may be handled at run-time.

Figure 1:
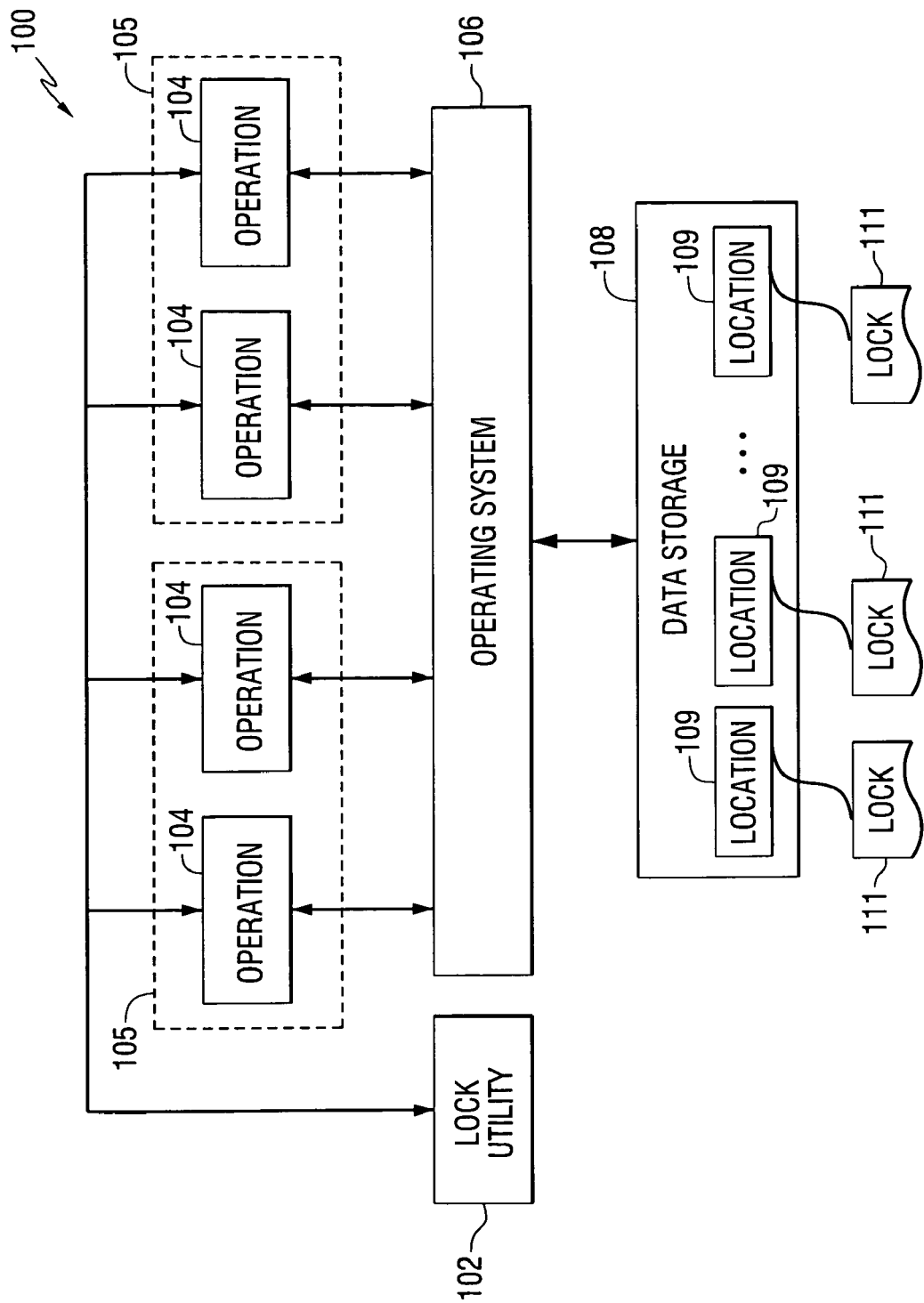
FIG. 1 shows a diagram of a system architecture according to various embodiments of the present invention.

FIG. 1 shows a system architecture 100, according to various embodiments, that may be used to implement lock utility functionality. The system architecture 100 may include one or more examples of a lock utility 102, an operation 104, an operating system 106, and data storage 108. In various embodiments, some of the operations 104 may be associated with an application or applications 105. For example, the operations 104 may be configured to perform one or more discrete tasks for the application 105. It will be appreciated that the architecture 100 may be implemented across one or more components of a computer system, such as computer system 600 described below with reference to FIG. 6.

In various embodiments, the operations 104 may access various system resources, such as data storage locations, external hardware devices, etc., via operating system 106. The operating system 106 may be any suitable operating system. For example, in various non-limiting embodiments, the operating system 106 may be any version of MICROSOFT WINDOWS, any UNIX operating system, any Linux operating system, OS/2, any version of Mac OS, etc. For example, the operating system 106 may allow the operations 104 to access and manipulate data stored at data storage 108.

Data storage 108 may include any kind of storage drive or memory capable of storing data in an electronic or other suitable computer-readable format. In certain non-limiting embodiments, data storage 108 may include a single fixed disk drive, an array of disk drives, an array of disk drives combined to provide the appearance of a larger, single disk drive, a solid state drive, etc. The physical components making up data storage 108 may be located at a single location, or multiple locations. Data storage 108 may include one or more discrete data locations 109 where data may be stored. In various embodiments, data locations 109 may include a single addressable location, or a range of addressable locations. FIG. 1 shows a lock 111 associated with each of the data storage locations 109. As described in more detail below, an operation 104 wishing to access a data location 109 should first hold the lock 111 associated with that data location. It will be appreciated that the locks 111 may be implemented in any suitable way. For example, in various embodiments, the locks 111 may be implemented as software abstractions handled by the operating system 106 and/or the lock utility 102. Also, in various embodiment, the locks 111 may be hardware-implemented.

It will be appreciated that the lock utility functionality described herein may be implemented by various pieces of the system architecture 100. For example, in various embodiments, all of the functionality may be implemented by the lock utility 102. In that case, the lock utility may receive requests to access data locations 109, determine whether locks should be issued, issue locks, etc., for example, as described below. In various embodiments, the lock utility 102 may implement its functionality in conjunction with the operating system 106 and/or a component thereof. For example, in various embodiments, the lock utility may receive requests to access data locations 109, and may determine whether a lock should issue, etc., but the actual issuance of locks and access to data locations 109 may be handled by the operating system 106. It will be appreciated that in other various embodiments, all lock functionality may be implemented by the operating system 106 or a component thereof.

Figure 2:
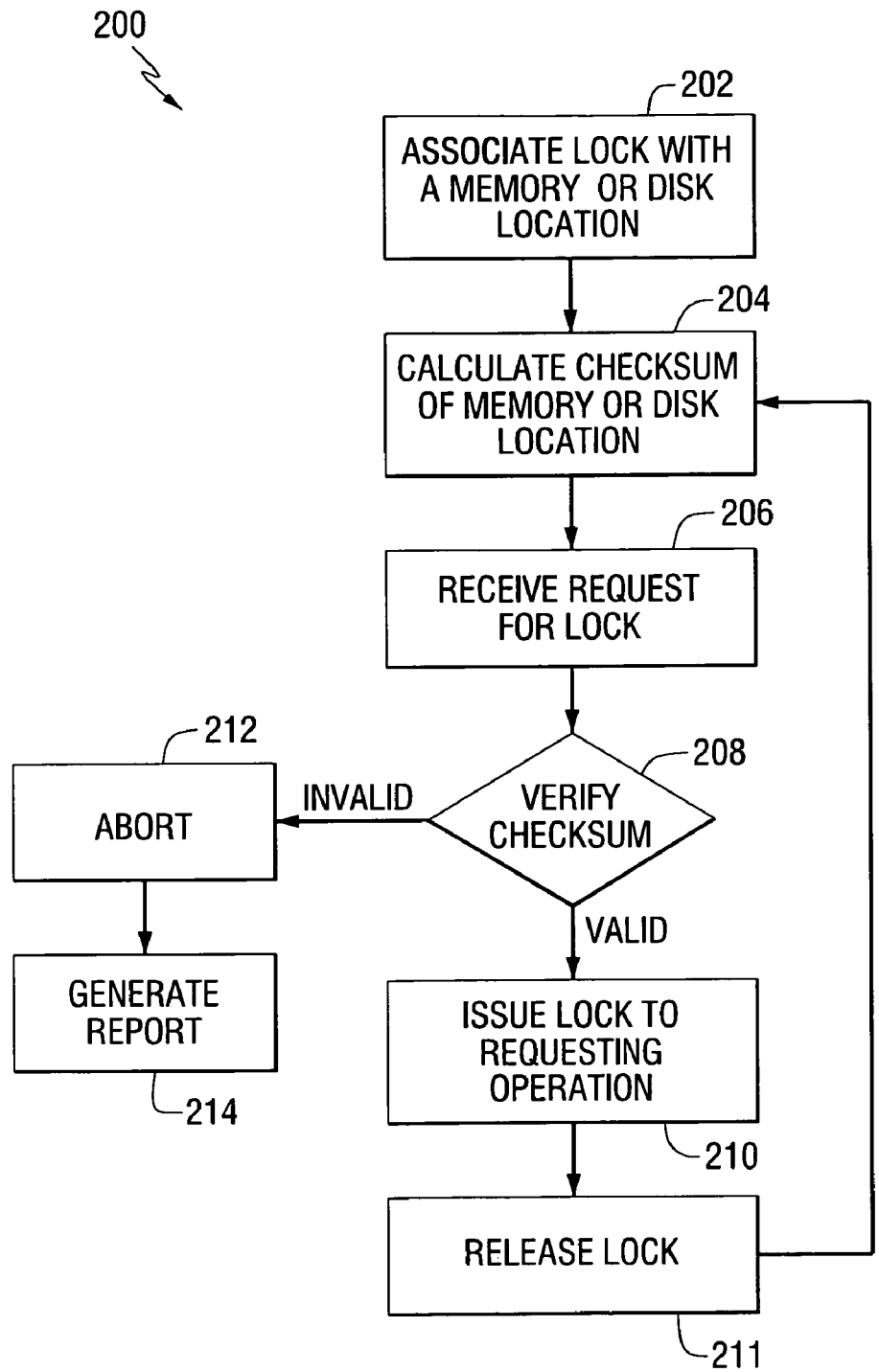
FIG. 2 shows a process flow for detecting potential race conditions according to various embodiments of the present invention.

FIG. 2 shows a process flow 200 for detecting a race condition according to various embodiments. At step 202, a lock may be associated with a particular location 109 at data storage 108. A checksum for the data value at data location 109 may be found at step 204 (e.g., by the lock utility 102, the operating system 106, etc.). In various embodiments, the checksum at step 204 may be taken immediately after the lock 111 associated with the data location 109 has been released by an operation 104. In this way, the checksum may take into account all authorized modifications to the data at location 109. At step 206, a request for the lock 111 may be received. The request may originate from an operation 104. The checksum may be verified at step 208. A valid checksum may indicate that it is unlikely that the data at location 109 has been modified since the lock 111 was most recently released. Accordingly, the lock 111 may be issued to the requesting operation at step 210. When the operation 210 has completed its use of the data, it may release the lock 111 at step 211. At that point, an additional checksum may be calculated at step 204 and the process may continue.

Referring back to decision step 208, if the checksum is not valid, it may indicate that the data at location 109 has been modified by a system entity that did not follow the proper locking procedure (e.g., a locking violation may have occurred). As a result, the data at location 109 may be corrupted and may cause an error if the operation 104, or even the application 105 associated with the operation 104, is allowed to continue. Accordingly, the operation 104 or application 105 may be aborted at step 212 to avoid or minimize errors due to potentially corrupted data. A report describing the circumstances of the abort may be generated at step 214. The report may identify the data location 109 at issue, operations 104 that have recently held the lock 111, the operation 104 that made the request, the various checksums, etc. The report may be used by quality assurance personnel or other debuggers to identify and/or isolate underlying problems in the application 105 or operating system 106 that caused the unauthorized access.

Figure 3:
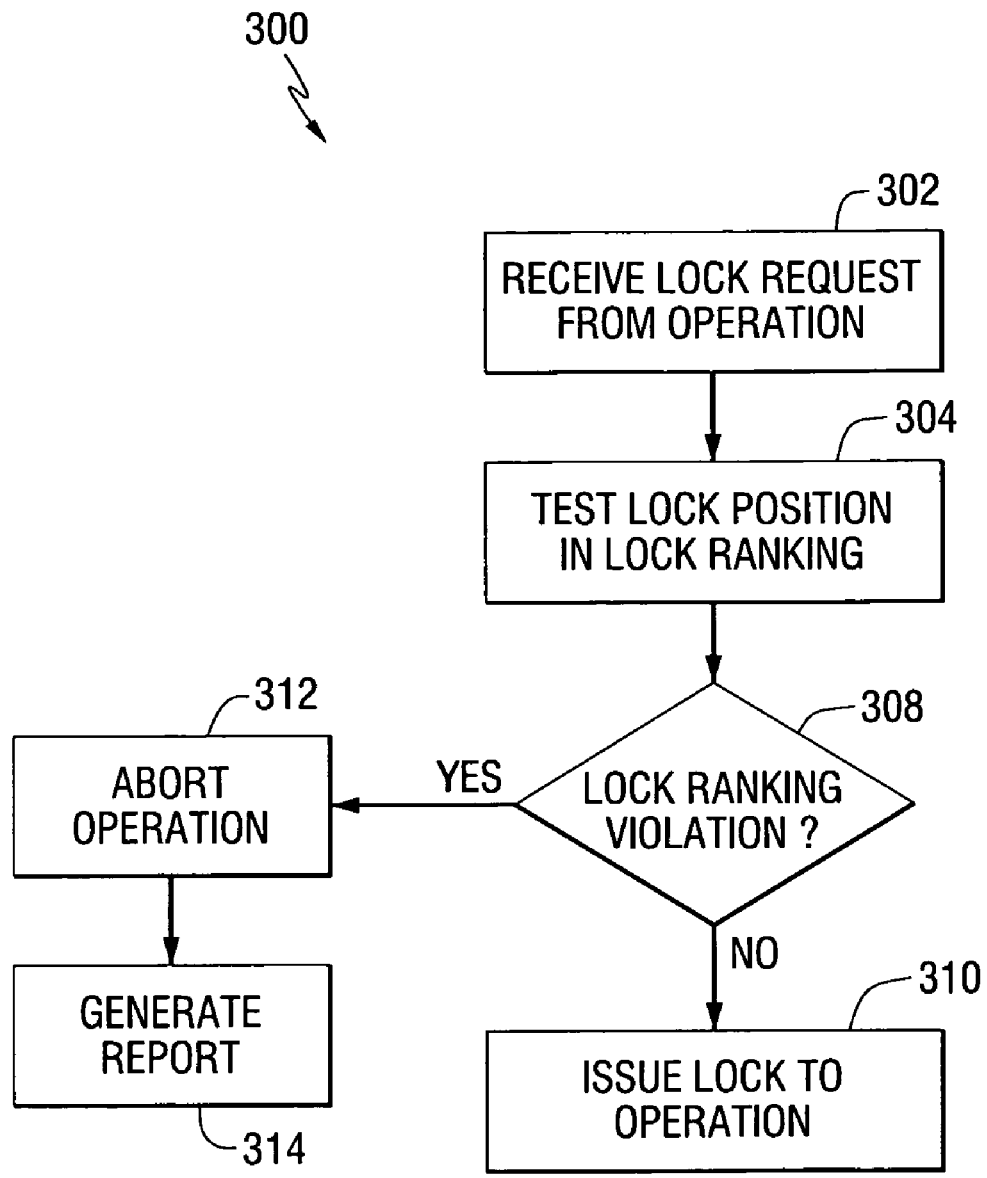
FIGS. 3-5 show process flows for detecting lock ranking violations according to various embodiments of the present invention.

FIG. 3 shows a process flow 300 for detecting potential deadlock situations. In various embodiments, the process flow 300 may be implemented with a predetermined lock ranking. The predetermined lock ranking may be a relative ranking of locks that define a common sequence in which all operations 104 should request and acquire locks. The lock ranking may be developed according to any suitable method. For example, in various embodiments, the lock ranking may be determined by a developer at the time that an application 105 or operation 104 is developed.

Referring back to FIG. 3, at step 302, a lock request may be received from one of the operations 104. At step 304, the rank of the requested lock 111 may be compared to the ranks of other locks currently held by the requesting operation 104. The lock utility 102 and/or the operating system 106 may facilitate this comparison by keeping a lock list for each of the operations 104, or at least for each of the operations 104 that possess a lock at any given time. The lock list for an operation 104 may include various information about the specific nature of the locks 111 issued to the operation 104. For example, for each lock 111, the lock list may indicate the rank of the lock 111, the type of the lock 111, whether the operation 104 has shared or exclusive ownership of the lock 111, whether there are any OS-enforced locking rules relating to the lock 111, whether the lock 111 may be reacquired by the operation 104, etc.

After comparing the rank of the requested lock 111 to those locks already held by the operation 104, it may be determined, at step 304, whether a lock rank violation will occur if the requested lock 111 is issued to the operation 104. For example, a lock rank violation may occur if the operation 104 already possesses one or more locks that are ranked higher than the requested lock 111 in the predetermined lock ranking (e.g. if the operation 104 already possesses a lock that should be obtained after the requested lock). If this is the case, then issuing the lock 111 to the operation 104 may cause a lock rank violation. If no potential lock rank violation is found, then the lock 111 may be issued to the operation at step 310.

If issuing the requested lock 111 to the operation 104 will cause a rank violation, then various steps may be taken. For example, as shown in FIG. 3, the offending operation 104 and/or the application 105 corresponding to the offending operation 104 may be aborted at step 312 to prevent a potential deadlock condition. A report detailing the potential lock ranking violation may then be generated at step 314. The report may include various information including, for example: the lock lists of some or all of the operations 104 that were active at the time of the abort, including the operation 104 that made the offending lock request. It will be appreciated that this report may be used by software debuggers to locate and pinpoint a defect or defects in the operation 104 or application 105 that caused the attempted lock rank violation. For example, the operation 104 that made the offending lock request may be modified to request locks 111 in the correct rank order.

Figure 4:
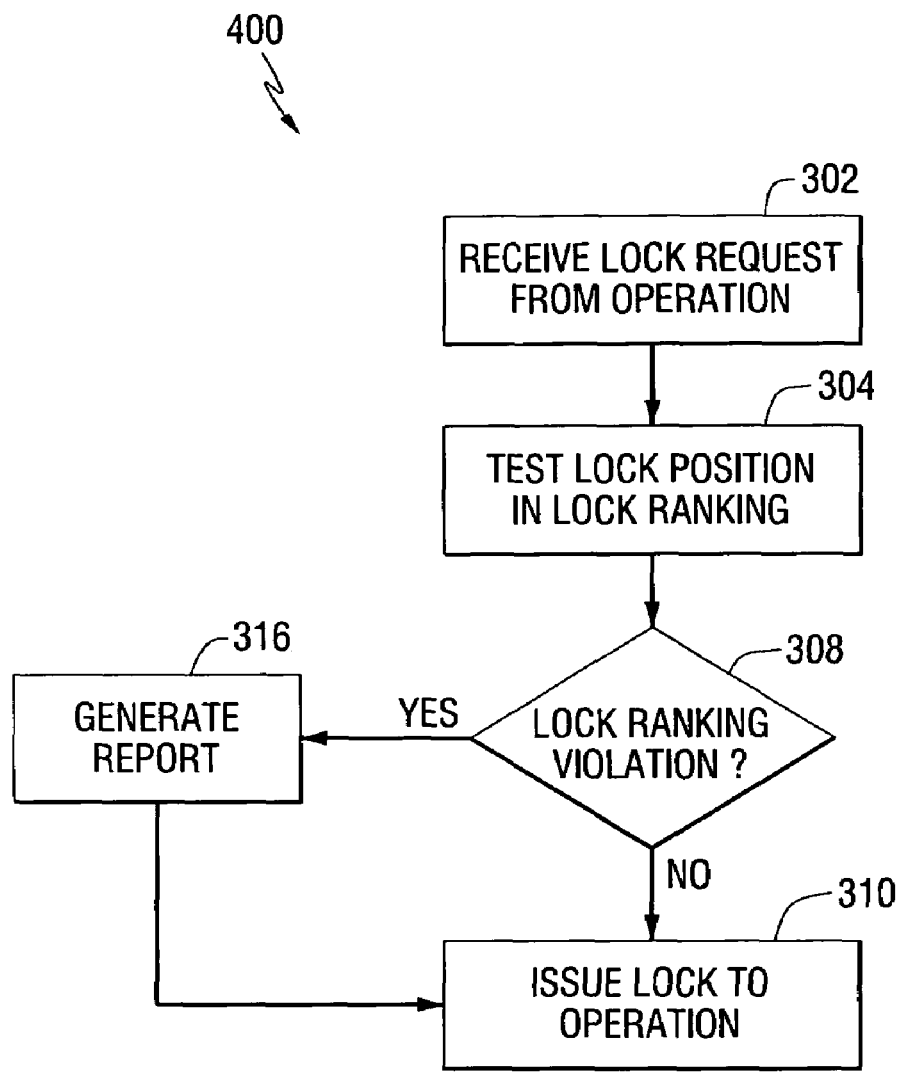

In various embodiments, as shown by process flow 400 in FIG. 4, if a potential lock rank violation is found at step 308, the report may be generated at step 316. The report may be used as described above. The process 400 may proceed to step 310, where the requested lock may be issued to the operation 104, even though doing so is a violation of the lock ranking. It will be appreciated that not all lock ranking violations will result in a deadlock condition. Accordingly, it may be desirable to allow the operations 104 to continue executing, even after a lock ranking violation is detected. In this way, if no deadlock condition does occur, the system will continue to run. In a debug environment, this may allow additional observations of the system to be made and additional bugs or defects may to be isolated. Also, in various embodiments, methods according to the process flow 400 could be implemented in production software. In this way, software in the field could be reviewed or monitored without inconveniencing software users with potentially unnecessary aborts.

Figure 5:
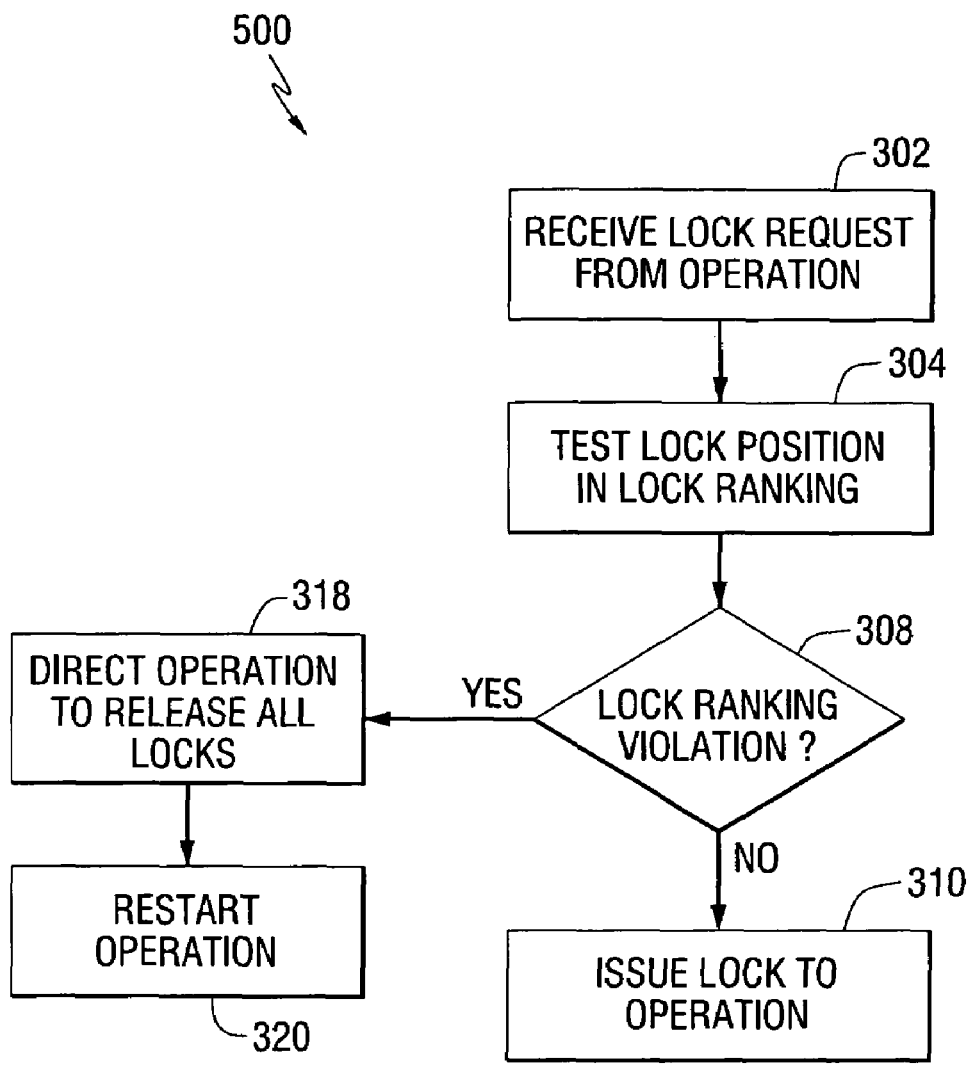

In other various embodiments, potential lock ranking violations may be corrected, for example, as shown by process flow 500 of FIG. 5. According to the process flow 500, if a potential lock ranking violation is detected at step 308, then the requesting operation 104 may be directed to release all of its locks at step 318. The operation 104 may be further instructed to restart, or to otherwise reacquire its locks at step 320. It will be appreciated that when the operation 104 releases and then reacquires all of its locks, its timing relative to other active operations 104 may be altered. In many cases, this alteration may be enough to prevent the potential lock rank violation from occurring again. In various embodiments, a report may also be generated, for example, as described above. Accordingly the process flow 500 may be used as a debugging tool, as described above, or may be used in production software to remedy potential lock ranking violations and prevent deadlock conditions.

Figure 6:
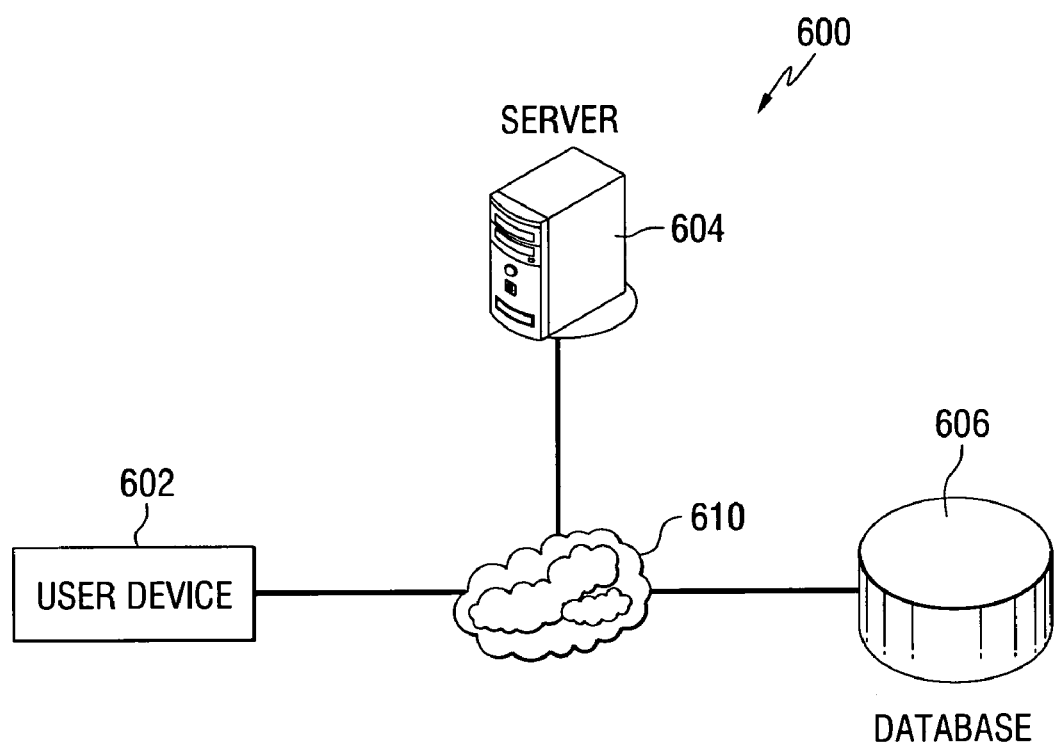
FIG. 6 shows a diagram of a computer system according to various embodiments of the present invention.

FIG. 6 shows a computer system 600 that may be used in the implementation of various embodiments. The computer system 600 may include various computing devices and/or constructs. For example, the computer system 600 may include one or more user devices 602, one or more servers 604, one or more databases 606, etc. A network 610 may provide connectivity between the devices 602, 604, 606 according to any suitable wired or wireless method.

The various devices 602, 604, 606 of the computer system 600 may generally store resources and/or execute software that may allow users (not shown) of the system 600 to perform various tasks, (e.g., use and/or manipulate the resources). User devices 602 may include any kind of device that allows a user to execute software, or access another device that may execute software (e.g., server 604). Example user devices 602 include a desktop computer, a laptop computer, a handheld computer, a personal digital assistant (PDA), etc. The user devices 602 may be used to monitor and/or manipulate software running on other components of the system 600 (e.g., the server 604), or access resources stored on other components of the system 600 (e.g., database 606). In various embodiments, however, user devices 602 may also store resources and/or execute software.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system," and the like, may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, a virtual computer system and/or any other computerized device or construct capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The described systems may include various modules and/or components implemented as software code to be executed by a processor(s) of the systems or any other computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A method of detecting a lock ranking violation in a computer system, the method comprising:
    receiving a request from an operation for a first lock associated with a first data storage location;
    reviewing a list of locks issued to the operation; and
    determining whether the operation possesses a lock ranked higher than the first lock.

2. The method of claim 1, further comprising issuing the first lock to the operation if the operation does not possess a lock ranked higher than the first lock.

3. The method of claim 1, further comprising generating a report, wherein the report includes information regarding the request.

4. The method of claim 3, wherein the report comprises the list of locks issued to the operation.

5. The method of claim 3, wherein the report comprises a list of locks issued to a second operation active at the time of the request.

6. The method of claim 1, further comprising aborting the operation if the operation possesses a lock ranked higher than the first lock.

7. The method of claim 1, further comprising issuing the first lock to the operation if the operation possesses a lock ranked higher than the first lock.

8. The method of claim 1, further comprising instructing the operation to release any locks that it possessed at the time of the request if the operation possesses a lock ranked higher than the first lock.

9. The method of claim 8, further comprising instructing the operation to reacquire the locks that it possessed at the time of the request.

10. The method of claim 1, wherein determining whether the operation possesses a lock ranked higher than the first lock comprises determining whether, according to a lock ranking, any locks included in the list of locks issued to operation are not properly attained by the operation until after the first lock.

11. The method of claim 10, wherein the lock ranking is predetermined.

12. The method of claim 1, wherein the first data storage location is a memory location.

13. The method of claim 1, wherein the first data storage location is a disk location.

14. The method of claim 1, wherein the first data storage location comprises a single addressable location.

15. The method of claim 1, wherein the first data storage location comprises a plurality of addressable locations.

16. A tangible computer readable medium having instructions thereon that when executed by a processor, cause the processor to perform the steps of:
- receiving a request from an operation for a first lock associated with a first data storage location;
- reviewing a list of locks issued to the operation; and
- determining whether the operation possesses a lock ranked higher than the first lock.

* * * * *

UNITED STATES PATENT AND TRADEMARK OFFICE
CERTIFICATE OF CORRECTION

| | | |
|---|---|---|
| PATENT NO. | : 7,512,748 B1 | Page 1 of 1 |
| APPLICATION NO. | : 11/505582 | |
| DATED | : March 31, 2009 | |
| INVENTOR(S) | : W. Anthony Mason et al. | |

It is certified that error appears in the above-identified patent and that said Letters Patent is hereby corrected as shown below:

Col. 3, line 14:

Please delete "embodiment" and substitute therefor --embodiments--.

Signed and Sealed this

Twentieth Day of October, 2009

David J. Kappos
*Director of the United States Patent and Trademark Office*